(12) United States Patent
Capitant et al.

(10) Patent No.: US 6,976,011 B1
(45) Date of Patent: Dec. 13, 2005

(54) PROCESS FOR MAKING REMOTE PAYMENTS FOR THE PURCHASE OF GOODS AND/OR A SERVICE THROUGH A MOBILE RADIOTELEPHONE, AND THE CORRESPONDING SYSTEM AND MOBILE RADIOTELEPHONE

(75) Inventors: Arnaud Capitant, Saint Jean le Blanc (FR); Christophe Francois, Neuilly-sur-Seine (FR); Sophie Frey, Saint Germain en Laye (FR); Abdallah Hitti, St.-Germain-en-Laye (FR); Olivier Jean-Marie, Bazoches (FR); Philippe Lucas, Palaiseau (FR); Philippe Mercier, Paris (FR); Jean-Pierre Wary, Bourg-la-Reine (FR)

(73) Assignee: Societe Francaise du Radiotelephone, Paris la Defense Cedex (FR)

( * ) Notice: Subject to any disclaimer, the term of this patent is extended or adjusted under 35 U.S.C. 154(b) by 513 days.

(21) Appl. No.: 09/332,489

(22) Filed: Jun. 14, 1999
(Under 37 CFR 1.47)

(30) Foreign Application Priority Data

| Jun. 15, 1998 | (FR) | ................................. 98 07666 |
| Oct. 23, 1998 | (FR) | ................................. 98 13471 |

(51) Int. Cl.[7] ............................................. H04L 17/60
(52) U.S. Cl. ........................... 705/67; 705/64; 705/68; 455/408; 455/406
(58) Field of Search ......................................... 705/57

(56) References Cited

U.S. PATENT DOCUMENTS

| 5,220,953 | A | * | 6/1993 | Jacobsen ..................... 164/200 |
| 5,561,706 | A | | 10/1996 | Fenner ......................... 379/60 |
| 5,754,655 | A | * | 5/1998 | Hughes et al. ................. 705/73 |
| 5,854,975 | A | * | 12/1998 | Fougnies et al. ........... 455/408 |
| 5,857,152 | A | * | 1/1999 | Everett ........................ 455/406 |
| 5,862,183 | A | * | 1/1999 | Lazaridis et al. ............ 235/381 |
| 5,991,404 | A | * | 11/1999 | Brahami et al. ............... 705/51 |
| 6,010,067 | A | * | 1/2000 | Elbaum ........................ 235/375 |
| 6,032,859 | A | * | 3/2000 | Muehlberger et al. ....... 235/379 |
| 6,073,029 | A | * | 6/2000 | Smith et al. ................. 455/461 |
| 6,170,745 | B1 | * | 1/2001 | Schilling ..................... 235/380 |
| 6,236,851 | B1 | * | 5/2001 | Fougnies et al. ........... 455/408 |

(Continued)

FOREIGN PATENT DOCUMENTS

| EP | 0 708 547 A2 | 4/1996 |
| EP | 0 780 802 A2 | 6/1997 |
| FR | 2 740 291 | 4/1997 |
| WO | 95/01695 | 1/1995 |
| WO | 96/25828 | 8/1996 |

Primary Examiner—Firmin Backer
(74) Attorney, Agent, or Firm—Kinney & Lange, P.A.

(57) ABSTRACT

The invention relates to a process for making a secure remote payment for goods and/or a service purchased by the buyer (2) from a supplier (7) using a mobile radiotelephone (1) used by the buyer. The mobile radiotelephone provides access to a radio communications network (5) managed through a management center (6). A payment server (4) is connected to the radio communications network (5). The process according to this invention comprises a step in which the said management center (6) and/or the said payment server (4) and/or a control center identifies the said buyer (2), identification of the buyer consisting of ensuring that the buyer is a bonafide subscriber registered on a list of subscribers to the said radio communications network (5). The process may also include a step to authenticate the said buyer (2).

22 Claims, 4 Drawing Sheets

U.S. PATENT DOCUMENTS

| | | | |
|---|---|---|---|
| 6,324,405 B1 * | 11/2001 | Young et al. | 455/12.1 |
| 6,326,918 B1 * | 12/2001 | Stewart | 340/686.1 |
| 6,363,355 B1 * | 3/2002 | Morrison et al. | 705/23 |
| 6,366,967 B1 * | 4/2002 | Wagner | 710/33 |
| 6,377,938 B1 * | 4/2002 | Block et al. | 705/32 |
| 6,397,126 B1 * | 5/2002 | Nelson | 700/231 |

* cited by examiner

PROCESS FOR MAKING REMOTE PAYMENTS FOR THE PURCHASE OF GOODS AND/OR A SERVICE THROUGH A MOBILE RADIOTELEPHONE, AND THE CORRESPONDING SYSTEM AND MOBILE RADIOTELEPHONE

This invention relates to a process for making remote payments for the purchase of goods and/or a service using a mobile radiotelephone. The invention also relates to a system and a mobile radiotelephone for embodiment of this process.

It is applicable to all types of mobile radiotelephones, in other words radiotelephones with a terminal only, and also mobile radiotelephones with a terminal that cooperates with a subscriber identification module.

In the GSM standard, the mobile radiotelephone (also called "mobile station") is of the second type, and the terminal and the subscriber identification module used in it are called the "mobile equipment" and "SIM (Subscriber Identity Module)" card respectively. Note that a SIM card is in the form of a microprocessor card that is slid into the mobile radiotelephone. It contains all individual information specific to the subscriber, and particularly the subscriber's International Module Subscriber Identity (IMSI), an individual authentication key (called Ki), and an individual authentication algorithm (called A3/A8).

Various electronic payment processes and systems have already been proposed.

Patent EP 451 057 B 1, published on Oct. 9, 1991 describes a process and a system making use of a payment server. The solution recommended in this patent involves the use of a card that sends a voice identification signal. This signal is received by the telephone microphone and is then transmitted to the payment server.

Patent application WO 96/32701 published on Oct. 17, 1996 also describes an electronic payment process making use of a payment server. It can be used to make transactions related to the purchase of goods offered by merchants by means of IT services through an open computer telecommunications network, for example the "Internet" network, to which merchant server stations and customer stations and a payment server station, are connected.

For the purposes of this invention, it is assumed that remote payment for goods or services through a mobile radiotelephone is made through a closed type of radio communications network. A closed radio communications network refers particularly, but not exclusively, to networks based on the GSM technology (for example GSM 900, DCS 1800, etc.).

Note that a closed radio communications network may obviously by connected to one (or several) open network(s) through platforms or gateways. Thus, a user of the closed radio communications network can use his mobile radiotelephone to access an open network. For example, the "Internet" open network can be accessed using a mobile radiotelephone from a GSM network, if the mobile radiotelephone has the means (such as a navigator or browser) of using a protocol based on a specific language such as the HDML (Handset Device Markup Language) or WML (Wireless Markup Language) or any other language of the same type and/or derived from one of the two above mentioned languages.

Due to the fact that a closed radio communications network does not enter into the category of open computer telecommunications networks, the solution recommended by application WO 96/32701 cannot be applied to the problem that arises with the invention (specifically remote payment for goods or services using a mobile radiotelephone).

The purpose of this invention is precisely to provide a process for secure remote payment for goods and/or a service purchased from a supplier, making use of a mobile radiotelephone.

Another purpose of this invention is to supply this type of payment process to minimize work done by the buyer, while offering optimum security.

These various objectives, and others that will appear later, are achieved according to the invention by means of a process for remote and secure payment for goods and/or a service purchased by a buyer from a supplier, making use of a mobile radiotelephone used by the said buyer, the said mobile radiotelephone enabling access to a radio communications network managed by a management center, a payment server being connected to the said radio communications network, the said process comprising the following step:

identification of the said buyer by the said management center and/or the said payment server and/or a control center, the said buyer identification consisting of making sure that the buyer is a subscriber correctly registered on a list of the subscribers to the said radio communications network.

Thus, at the end of this buyer identification step, the payment server manager is assured that the buyer is a bona fide member of the radio communications network to which the payment server is connected.

Note that if the buyer is identified by the radio communications network management center, the radio communications operator (who is responsible for operation of this management center) becomes a "semi-trusted third party" towards the bank organization (which is responsible for operation of the payment server), within the framework of this invention. In this case the bank organization simply authenticates the buyer, the operator being responsible for the identification of the person in possession of the mobile radiotelephone.

Preferably, the said buyer identification step itself includes the following steps in sequence:

subscriber identification, enabling the said management center and/or the said payment server and/or the said control center to receive a subscriber identifier specific to the said buyer, as a user of the said radio communications network;

subscriber authentication, enabling the said management center and/or the said payment server and/or the said control center to check the said subscriber identifier that was sent to it (them) during the said subscriber identification step.

Thus, during the first buyer identification step, advantage is taken of the fact that the subscriber in a closed radio communications network (for example of the GSM type) must be identified and authenticated by the operator responsible for the charging system, to prevent fraud and to ensure that billing is correct. Therefore, the security provided by the physical layers of a closed network, for example of a GSM type, is astutely used. Note that in an open network, for example such as Internet, security is applied at application level.

Preferably, the said subscriber authentication step itself comprises the following steps:

the said management center and/or the said payment server and/or the said control center supplies a random number to the said mobile radiotelephone;

the said mobile radiotelephone generates a subscriber's electronic signature:
  with an individual authentication algorithm and/or an individual authentication key contained in protected areas of the mobile radiotelephone, and
  using the said random number;
the mobile radiotelephone transmits the said subscriber's electronic signature to the said management center and/or to the said payment server and/or to the said control center;
the said management center and/or the said payment server and/or the said control center checks the said subscriber's electronic signature.

Thus the subscriber authentication procedure specified in the GSM standard is used during the buyer identification step. It is important to note that the subscriber authentication procedure must in no case be confused with the buyer authentication procedure.

Preferably, the said process also comprises a step in which the said management center and/or the said payment server and/or the said control center authenticates the said buyer, and possibly a decision to buy the goods and/or service purchased by the buyer.

Thus, at the end of this buyer authentication step, the payment server manager is assured that the buyer is authorized to pay for the purchased goods and/or services. Therefore, the payment server manager can authorize the payment, or make compensation movements between the buyer's account and the supplier's account.

In one preferred embodiment of the invention, the said buyer authentication step, and possibly the purchase decision, itself comprises the following steps:
  the mobile radiotelephone generates a buyer's electronic signature;
  the mobile radiotelephone transmits the said buyer's electronic signature to the said management center and/or the said payment server and/or the said control center;
  the said management center and/or the said payment server and/or the said control center checks the said buyer's electronic signature, the said buyer's electronic signature being kept available for use by the buyer and the supplier.

According to one advantageous variant, the said buyer authentication step, and possibly the purchase decision step, itself comprises the following steps:
  the buyer may input a confidential payment code into the mobile radiotelephone, using a keypad associated with the mobile radiotelephone;
  the mobile radiotelephone sends a secure transmission of the said confidential payment code to the said management center and/or the said payment server and/or the said control center;
  the said management center and/or the said payment server and/or the said control center checks the said confidential payment code.

Thus, according to this variant, there is no need to calculate a signature. For example, a secure transmission could be a transmission in an encrypted form.

Advantageously, the said buyer authentication step, and possibly the purchase decision, also comprises a step in which the buyer inputs a confidential payment code into the mobile radiotelephone by means of a keypad associated with the mobile radiotelephone; in particular, the said buyer's electronic signature may be generated as a function of the said confidential payment code.

This optional step increases the security with which the buyer is authenticated.

Two advantageous embodiments of this step for inputting the confidential payment code may be considered.

In a first variant, this step is carried out using an input algorithm stored in the said mobile radiotelephone. Thus in this first variant, the radiotelephone permanently stores the input algorithm (in the terminal and/or the subscriber identification module). Therefore, it requires a few modifications within the radiotelephone (in the terminal and/or the subscriber identification module).

In the second variant, this step is carried out using at least one downloaded page in the HDML or an equivalent format provided for this purpose. Thus, in this second variant, the radiotelephone contains no permanent storage for any input algorithm.

Preferably, the said step in which a buyer's electronic signature is generated is made with a payment security algorithm and/or a payment security key contained in protected areas of the mobile radiotelephone, starting from data related to the transaction and/or data about the buyer.

Note that the buyer's electronic signature authenticates either the buyer alone or the buyer and the buying decision, depending on whether or not it takes account of data related to the transaction. It can be used to arbitrate about disputes between the buyer and/or the supplier and/or the payment server. It is essential if a dispute arises.

Advantageously, at least some of the said data related to the transaction include variability.

Advantageously, the said payment security algorithm and/or the said payment security key is (are) stored in protected areas of the said terminal. According to one advantageous variant, data is stored in protected areas of the said subscriber identification module.

Advantageously, the said process also comprises the following step: the mobile radiotelephone is unlocked if a comparison between a confidential identification code contained in protected areas of the mobile radiotelephone, and a secret key known to the buyer and input by the buyer into the mobile radiotelephone using a keypad, is positive.

This "unlocking" (also called "initialization") of the mobile radiotelephone is an additional optional verification known in itself, and offered by some operators, particularly in GSM type networks. Note that the Personal Identity Number (or PIN code) is input by the subscriber, for example each time that the subscriber identification module is inserted into the terminal, or each time that the terminal is switched on.

Preferably, at least some of the said protected areas of the mobile radiotelephone are contained in a subscriber identification module.

For security reasons, in order to make the terminal as independent as possible from the user, it is preferable to confine a maximum amount of personal and confidential information (algorithm and individual authentication key, payment algorithm and security key, etc.) in the subscriber identification module.

Advantageously, the said process also comprises a step in which data related to payment for the purchase of goods and/or the service are encrypted, exchanged between the mobile radiotelephone and the management center and/or the payment server and/or the control center, to ensure that the purchase is confidential.

Advantageously, the said process also comprises a step to check the integrity of data related to payment for the purchase of goods and/or the service exchanged between the mobile radiotelephone and the management center and/or the payment server and/or the control center, so that a defrauder is unable to modify the said data.

In a preferred embodiment of the invention, the said buyer is associated with an electronic wallet comprising:
- a wallet identifier associated with a subscriber identifier specific to the said buyer, as a user of the said radio communications network;
- means of payment;
- information about the said buyer and/or the account(s) of the said buyer; use of the said means of payment, particularly when purchasing goods and/or a service not being authorized until the buyer has been successfully identified, and possibly authenticated.

Identification and authentication (if necessary) of the buyer may also be seen as identification and authentication (if applicable) of this buyer's electronic wallet. Several cases may arise, such as for example:
- a subscriber (and a corresponding subscriber identification module) is associated with a single electronic wallet;
- several subscribers (and therefore several corresponding subscriber identification modules) share the same electronic wallet (for example the case of a company holding the wallet);
- the same subscriber (and the corresponding subscriber identification module) is associated with several electronic wallets.

Note that, due to the correlation between the wallet identifier and the subscriber identifier (the subscriber being the buyer), the identification of the buyer (as a subscriber) provides an implicit identification of his electronic wallet. Note that in the third case mentioned above, one of the subscriber's electronic wallets may for example be chosen by default or, as a variant, the buyer may be offered the possibility of making a choice from the several electronic wallets available to him.

After identification, and possibly after authentication, the buyer may use the payment means contained within his electronic wallet.

Advantageously, the said electronic wallet also comprises a confidential payment code known to the said buyer. Note that this confidential payment code input by the buyer using the radiotelephone keypad, may be used during the calculation of the buyer's electronic signature, so that the buyer and possibly the buying decision, can be authenticated.

Preferably, the said electronic wallet is stored in one of the elements belonging to the group consisting of the said terminal, the said subscriber identification module, the said payment server, the said management center and the said control center.

In other words, various locations of the electronic wallet may be considered without going outside the framework of this invention.

The invention also relates to a system for secure remote payment of goods and/or a service purchased by the buyer from a supplier, using a mobile radiotelephone used by a buyer.

The invention also relates to a mobile radiotelephone used by a buyer for secure remote payment of goods and/or a service purchased by the buyer from a supplier.

This system and this radiotelephone according to the invention comprise means of embodying the process mentioned above.

Other characteristics and advantages of the invention will become obvious from reading the following description of different variant embodiments of the invention, given for information and for non-restrictive purposes, and the attached drawings in which.

Figure 5:
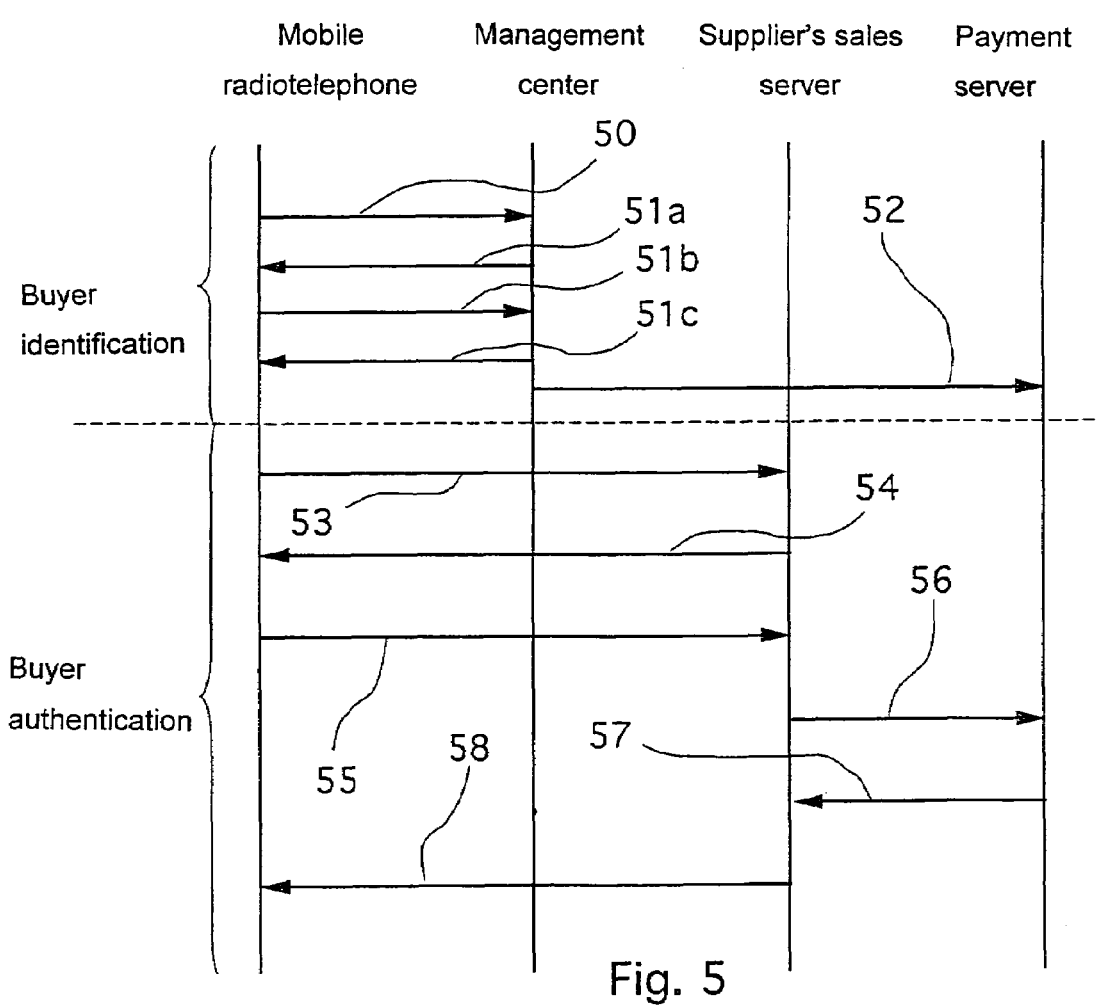
Figure 6:
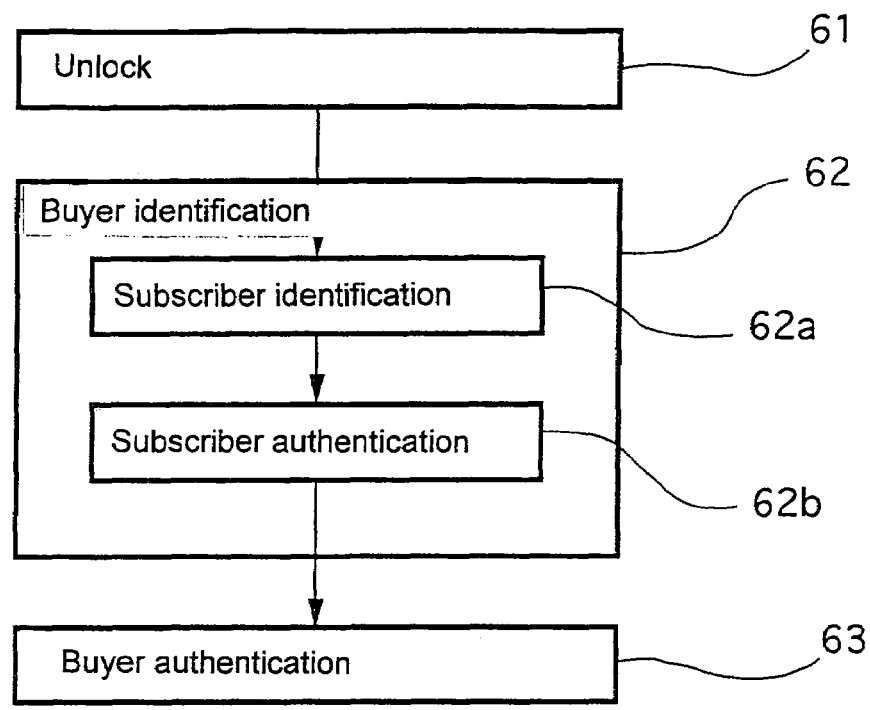
Figure 7:
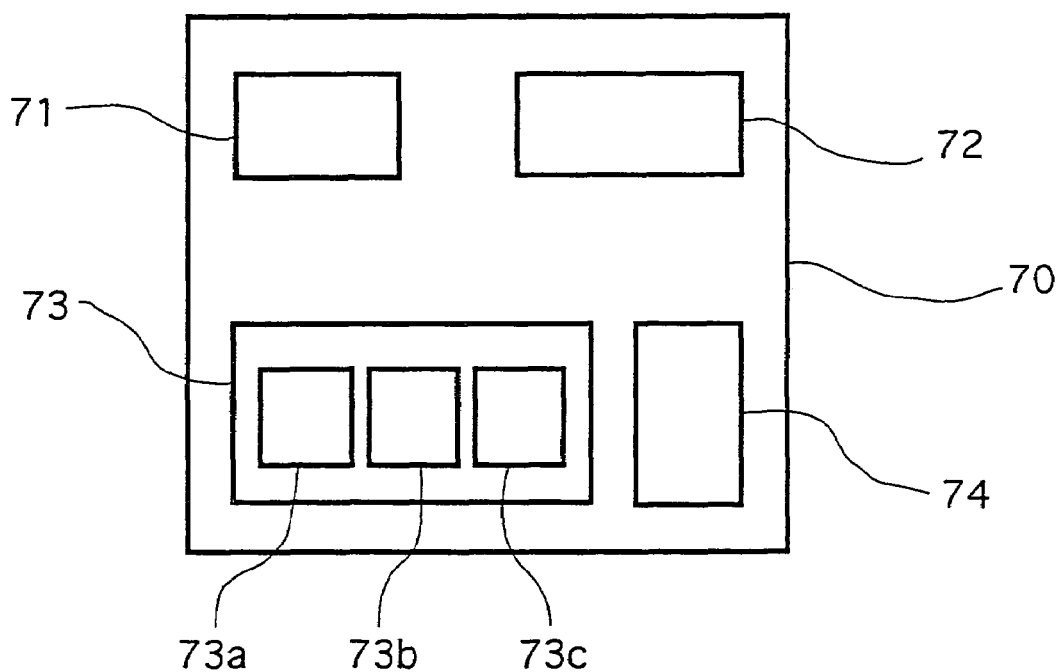

FIG. 5 contains an organization chart showing the steps of operations related to the purchase of goods and/or a service;

FIG. 6 contains a simplified flowchart showing a particular embodiment of the process according to the invention; and FIG. 7 shows a view of a particular embodiment of an electronic wallet according to the invention, in the form of a block diagram.

Therefore the invention relates to a process, and a corresponding system and mobile radiotelephone, that a buyer can use to make remote payments for the purchase of goods and/or a service, using a mobile radiotelephone.

Figure 1:
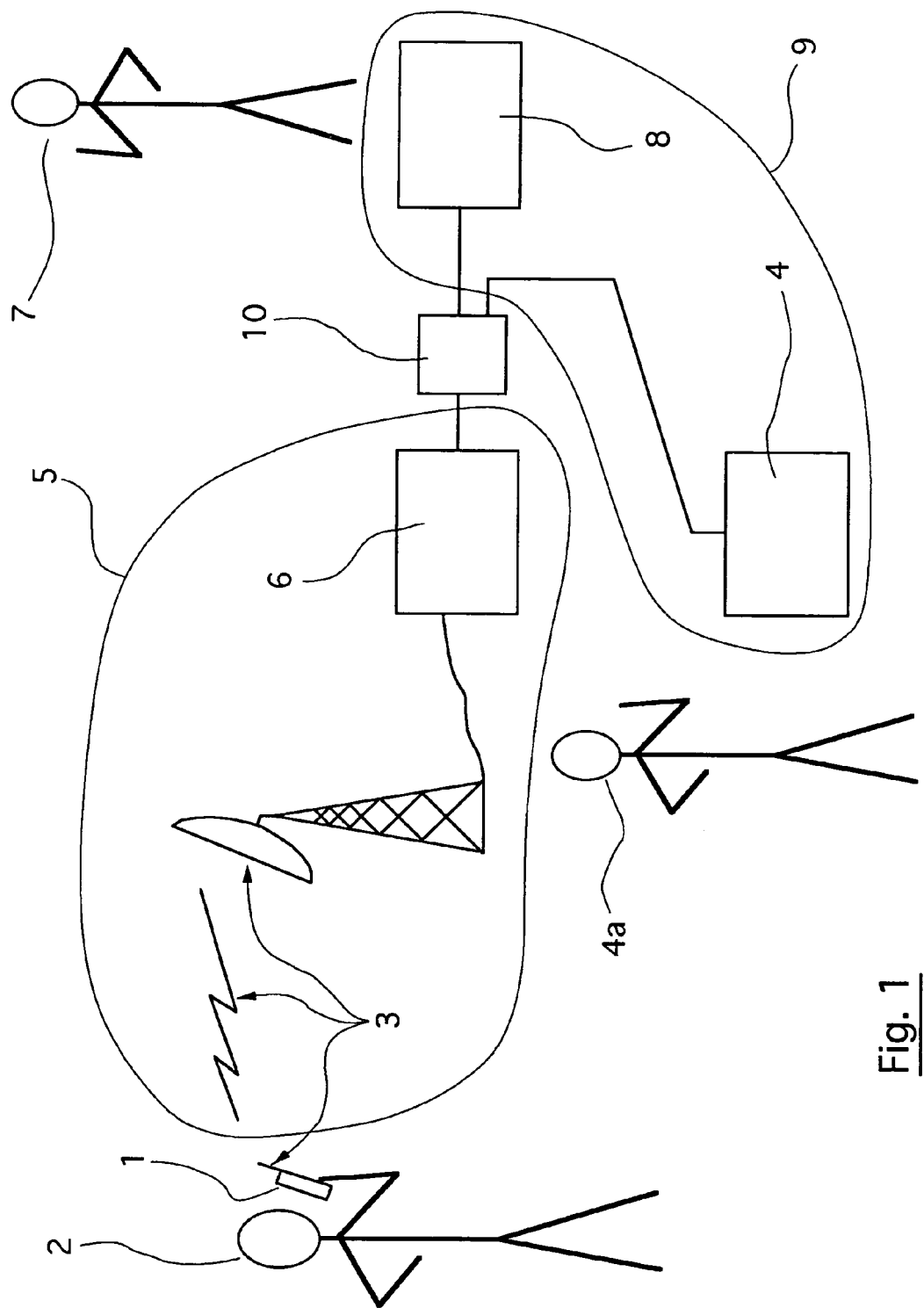
FIG. 1 shows a diagrammatic overall view of a particular embodiment of a system according to the invention.

In the particular embodiment shown in FIG. 1, the system comprises a mobile radiotelephone 1 enabling access to a radio communications network 5 (for example a GSM network) managed by a management center 6, through a radio relay link 3. A payment server 4 and a sales server 8 are also connected to the radio communications network 5.

In the example presented, the payment server 4 and the sales server 8 are connected to an open computer telecommunications network, for example the Internet network 9. The radio communications network 5 is interconnected to this Internet network 9, through a gateway 10 (for example a UP access platform marketed by the Unwired Planet Company). In this case the mobile radiotelephone is provided with a navigator (for example a "UP browser" (registered trademark) navigator marketed by the Unwired Planet Company) which enables it to navigate through the gateway within the Internet network and particularly to access the payment server 4 and the sales server 8.

The system enables a buyer 2 provided with a mobile radiotelephone 1, and therefore in this case also assumed to be a subscriber registered with the radio communications network operator 5, to make a secure remote payment for goods and/or a service that he has purchased from a supplier 7 who has a remote sales server 8.

Figure 2:
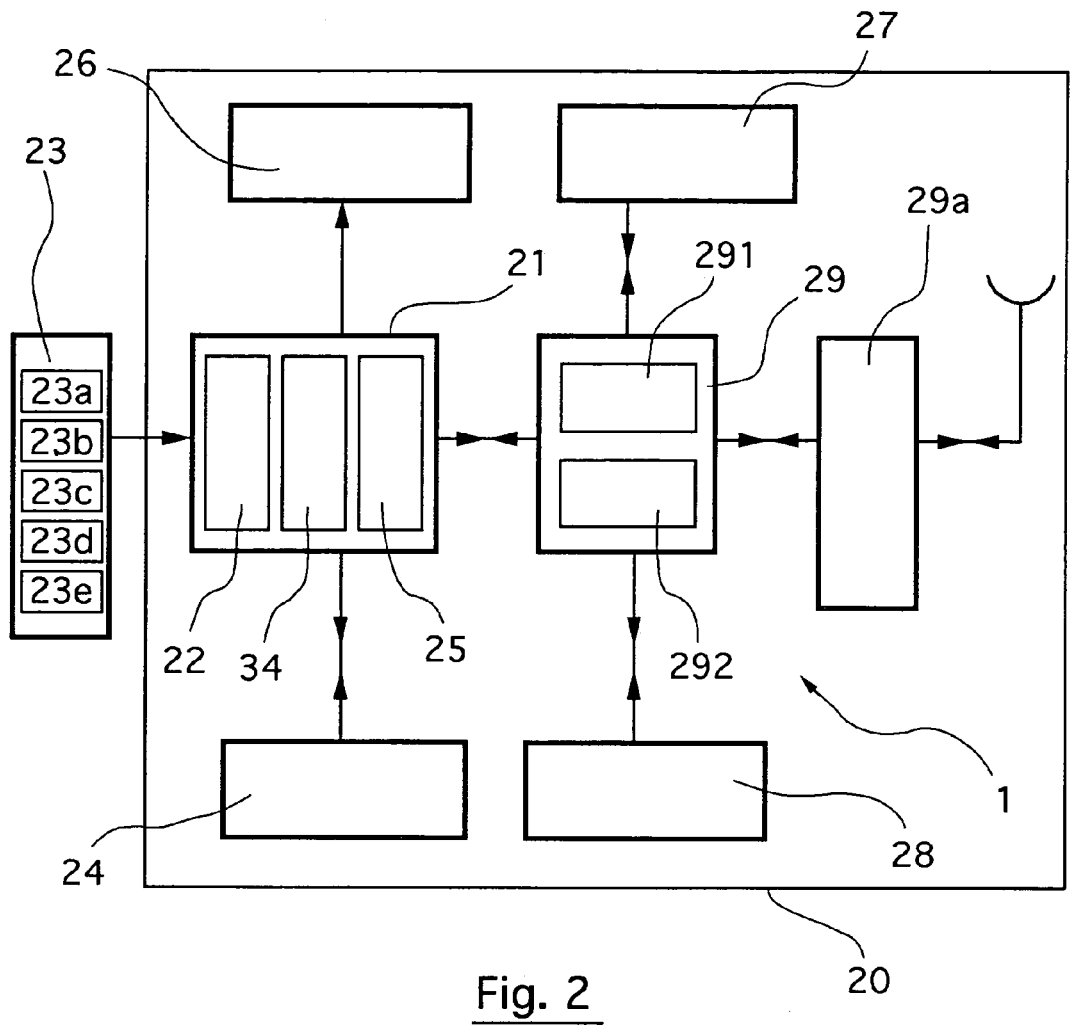
FIG. 2 shows a view of a particular embodiment of a mobile radiotelephone according to the invention, in the form of a block diagram.
Figure 3:
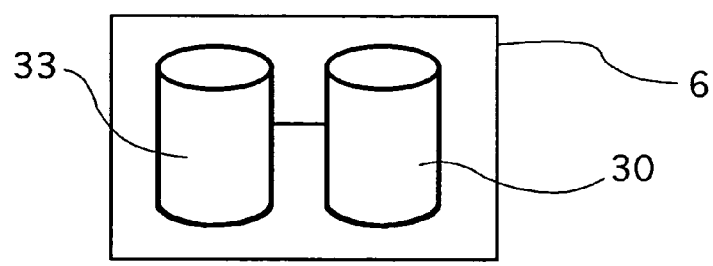
FIG. 3 shows a view of a particular embodiment of a management center according to the invention, in the form of a block diagram.
Figure 4:
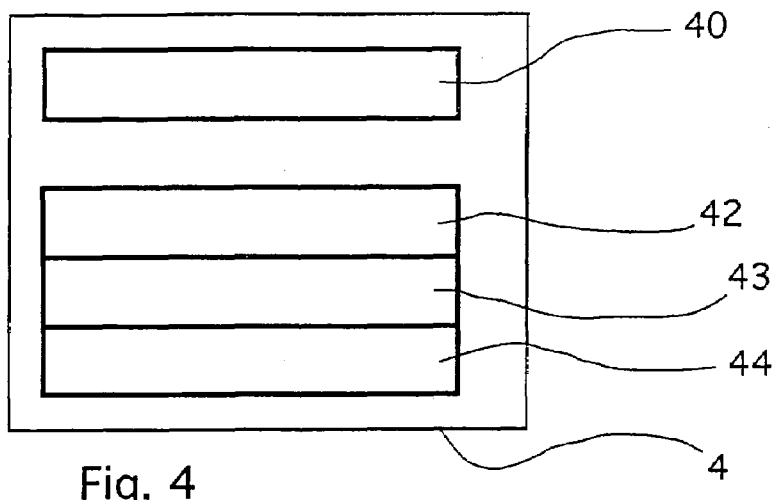
FIG. 4 shows a view of a particular embodiment of a payment server according to the invention, in the form of a block diagram.

In the particular embodiment presented in FIG. 2, the mobile radiotelephone 1 comprises a terminal 20 that works in cooperation with a SIM card 23. However, it is obvious that this invention is also applicable to a radiotelephone consisting of the terminal alone (in other words not including the subscriber identification module).

In a manner known in itself, the terminal 20 may for example include a communication management module 21 and an information processing module 29, around which a keypad 24, a display screen 26, a loudspeaker 27, a microphone 28 and radio transmission-reception means 29a (including an antenna) are interconnected.

It is obvious that the information is also more generally applicable to any type of mobile radiotelephone. Thus, the "conventional" terminal as described above may be replaced by any type of radio communications module that can be connected to a radio communications network, for example like a terminal without a keypad or a screen, or a microcomputer working together with a terminal through a PCMCIA ("Personal Computer Memory Card International Association") or equivalent type of card.

The process according to the invention comprises the following steps, as shown in the flowchart in FIG. 6:
- (optionally) unlock (61) (or initialize) the mobile radiotelephone 1;
- the management center 6 and/or the payment server 4 and/or an independent control center (not shown) identifies (62) the buyer as a user of the radio communications network;
- (optionally) the management center 6 and/or the payment server 4 and/or the control center (not shown) authenticates (63) the buyer, and possibly a purchase decision made by the buyer to purchase goods and/or a service.

The (optional) step 61 in which the radiotelephone 1 is unlocked is known in itself, and may for example take place as follows: the buyer 2 inputs a personal identity number (or PIN code according to GSM terminology) on the keypad 4, then the radiotelephone 1 compares the personal identity number input by the buyer with the personal identity number stored in protected areas in the mobile radiotelephone 1 (typically in the SIM card 23). The radiotelephone 1 is not "unlocked" (in other words made operational in the radio communications network) unless the comparison is positive.

The step 62 in which the buyer 2 is identified according to this invention, consists of identifying and authenticating the subscriber, who is the buyer when he uses the radiotelephone. Therefore, for example this step 62 includes the following conventional steps:
- subscriber identification (62a), by which the management center 6 receives a subscriber identifier specific to the buyer as a user of the radio communications network. The subscriber identifier 23a, or IMSI according to the GSM terminology, is typically stored in the SIM card 23;
- subscriber authentication (62b), allowing the management center to check the subscriber identifier sent to it in subscriber identification step 62a.

Note that the buyer identification step (consisting of a subscriber identification and authentication) is carried out automatically, in other words it requires no action by the buyer. The buyer only takes part in the next step of buyer authentication, when he is asked to input his confidential payment code.

It is also important to note that the subscriber authentication step 62b must in no case be confused with the buyer authentication step 63 presented in detail below. Authentication of the subscriber (who is the buyer) only takes place for the purpose of buyer identification. It can be understood that this buyer identification then needs to be used together with buyer authentication, so that the payment server verifies that the identified buyer is authorized to make purchases.

As an example only, refer to FIG. 5 which shows the "conventional" procedure used in GSM for these subscriber identification 62a and authentication 62b steps. The radiotelephone 1 sends the user's subscriber identifier (IMSI) 50 to the management center 6. After the subscriber has thus been identified (62a), the management center 6 must check his identity, in other words must authenticate him (62b). This is done by the management center 6 supplying a random number ("RAND") 51a to the radiotelephone 1. Starting from this random number, and using an algorithm ("A3/A8") 23b and an individual authentication key ("Ki") 23c contained in protected areas of the mobile radiotelephone (typically the SIM card 23), the radiotelephone 1 calculates a subscriber's electronic signature ("SRES"). This subscriber's electronic signature 51b is sent to the management center 6 (and more precisely to a subscriber management module 30) which checks it by comparing it with the signature that it calculated locally. If the two subscriber's electronic signatures are identical, the subscriber authentication (and for the purposes of the invention, the buyer identification) is successful (the person holding the mobile radiotelephone 1 is on the subscribers list) and the management center sends messages 51c and 52 to confirm this to the radiotelephone 1 and to an identification module 40 located in the payment server. Furthermore, the GSM technology enables independent authentication of the communication set up as a function of the network topology (when setting up, during a handover, etc.).

In summary, after execution of the buyer identification step 62, the manager 4a of the payment server 4 is assured that the person 2 holding the mobile radiotelephone 1 (in other words the buyer in this case) is correctly registered on the subscribers list, and therefore that he is a bona fide member of the radio communications network to which the payment server 4 is connected.

The buyer identification step 62 may be followed by a buyer authentication step 63. In this step, the manager 4a of the payment server 4 assures itself that the buyer 2 in possession of the mobile radiotelephone 1 at the time of the payment is authorized to pay for the purchased goods and/or services. If so, the payment server manager can then authorize payment or make compensation movements between the buyer's account 2 and the supplier's account 7. This buyer authentication step 63 may be used before or after the buyer has made the purchase decision.

In one particular embodiment, the buyer authentication step 63 comprises the following steps:
- (optionally) the buyer 2 uses the keypad 24 on the mobile radiotelephone 1 to input a confidential payment code. For example, this input step may be carried out using an input algorithm stored in the mobile radiotelephone (in the SIM card 23 or in the terminal 20), or according to one variant, using one or several downloaded pages in the HDML or equivalent format, and provided for this purpose;
- the mobile radiotelephone generates a buyer's electronic signature:
  - with an algorithm 23d and a payment security key 23e contained in the protected areas 23 of the mobile radiotelephone (either in the terminal 20 or in the SIM card 23);
  - starting from data about the transaction (such as the contents and/or the price) and/or data about the buyer (such as the confidential payment code, if the buyer had input the payment code). Furthermore, data about the transaction may include elements supplying variability on the signature (for example such as the time date of the transaction, a random number, a transaction serial number, etc.);
- the mobile radiotelephone 1 transmits the buyer's electronic signature to the payment server 4;
- the buyer's electronic signature is checked in a check module 42 included in the payment server 4. The buyer's electronic signature is kept available to the buyer 2 and the supplier 7. This check may also be carried out by the subscriber management center 6 or by the control center (not shown). In the former case, the subscriber management center 6 comprises an authentication module 33 for radiotelephone holders subscribing to the remote payment service.

The procedure adopted in this particular embodiment (given as an example) of the buyer authentication step then continues (refer to the lower part of FIG. 5). The buyer 2 sends a purchase request 53 to the sales server 8 of the supplier 7. In return, he receives data about the price of the goods and/or service 54. The buyer then makes a purchase decision 55. At the same time, the calculation means (typically a microprocessor) in the mobile radiotelephone calculate a buyer's electronic signature. The mobile radiotelephone 1 uses transmission means 29a to send the buyer's purchase decision and his electronic signature firstly to the server 8 of the supplier 7 (arrow marked 55) and secondly to the payment server 4 (arrow marked 56). The payment server 4 includes a check module (or certification module) 42 to check (or certify) the buyer's electronic signature. This check module 42 checks the signature, for example by carrying out calculations with operations exactly the same as those carried out in the mobile radiotelephone at the time of the purchase. If the payment server 4 accepts the transaction, a "transaction accepted" message 57 is sent to the supplier's server 8 through a reception acknowledgment module 43 on the payment server 4. The supplier's server 8 sends a "purchase confirmation" message 58 to the buyer (to the buyer's mobile radiotelephone and/or the buyer's home). The buyer's electronic signatures are stored by a storage module 44 on the payment server 4 and are kept available to the buyer and the supplier.

It is obvious that if the subscriber management center 6 or the control center (not shown) checks (or certifies) the buyer's electronic signature, then the subscriber management center or the control center will include checking, acknowledgment and storage type modules like 42, 43 and 44 described above for the payment server 4.

According to another variant that is easier to implement, the buyer authentication step 63, and possibly the purchase decision itself, includes the following steps:

the buyer inputs a confidential payment code into the mobile radiotelephone 1 using the keypad 24 associated with the mobile radiotelephone. This input step may for example be carried out using an input algorithm stored in the mobile radiotelephone (in the SIM card 23 or in the terminal 20) or according to one variant, using one or several downloaded pages in the HDML format or equivalent format provided for this purpose;

the mobile radiotelephone makes a secure transmission of the confidential payment code to the payment server 4;

the payment server 4 checks the confidential payment code (for example by verifying that this confidential payment code actually belongs to a predetermined list of valid payment codes).

Regardless of what embodiment is chosen, after the buyer authentication step 63, the manager 4a of the payment server 4 is assured that the buyer 2 in possession of the mobile radiotelephone 1 at the time of the payment is authorized to pay for the purchased goods and/or services. The buyer's electronic signature is sufficient to arbitrate any disputes that may arise between the buyer 2 and/or the supplier 7 and/or the manager 4a of the payment server 4.

According to this invention, the radiotelephone 1, for example in the communications management module 21, comprises various means necessary for implementing the various steps in the process as described above (through several implementations and variants). In particular, the radiotelephone comprises means 22 necessary for unlocking the radiotelephone, means 34 necessary for identifying the buyer, and means 25 necessary for authenticating the buyer.

The communication management means and/or information processing means 29 of the mobile radiotelephone 1 may also comprise means 291 of encrypting data about payment for the purchase of goods and/or services exchanged between the mobile radiotelephone 1 and/or the management center 6 and/or the payment server 4 and/or the control center, in a manner known in itself. These encryption means assure confidentiality of the purchase.

Information processing means 29 of the mobile radiotelephone 1 may also comprise means 292 of controlling the integrity of data related to payment for the purchase of goods and/or services, exchanged between the mobile radiotelephone 1 and/or the management center 6 and/or the payment server 4 and/or the control center, in a manner known in itself. Thus, a defrauder is unable to modify these data.

Furthermore, according to this invention, each buyer may be associated with an electronic wallet 70. A shown in FIG. 7, this wallet 70 may for example comprise:

a wallet identifier 71 associated with a subscriber identifier (for example the subscriber's "IMSI") specific to the buyer (as a user of the radio communications network);

a confidential payment code 72, known only to the buyer 2;

payment means 73, particularly but not exclusively an electronic wallet 73a (usually for amounts less than a predetermined threshold), a credit card holder 73b (usually for amounts greater than the above mentioned predetermined threshold), or any other payment means 73c available to the buyer provided by bank organizations.

information 74 about the buyer and/or his account(s).

Use of payment means 73 is only authorized, particularly when purchasing goods and/or a service, after successful identification and possibly authentication of the buyer 2.

This electronic wallet may be stored in various locations, namely in the terminal 20, in the SIM card 23, in the payment server 4, in the management center 6 or in the control center (not shown).

What is claimed is:

1. Process for remote and secure payment for goods and/or a service purchased by a buyer from a supplier within an open network, making use of a mobile radiotelephone within a closed radiocommunications network used by the buyer, the mobile radiotelephone enabling access to the closed radio communications network managed by a management center, a payment server being connected to the closed radio communications network, characterized in that the process includes the following step:

identification of the buyer by the management center and/or the payment server and/or a control center based on a request from the supplier within the open network, the buyer identification consisting of making sure that the buyer is a subscriber correctly registered on a list of subscribers to the closed radio communications network.

2. Process according to claim 1, characterized in that the said buyer identification step itself includes the following steps in sequence:

subscriber identification, enabling the said management center and/or the said payment server and/or the said control center to receive a subscriber identifier specific to the said buyer, as a user of the said radio communications network;

subscriber authentication, enabling the said management center and/or the said payment server and/or the said control center to check the said subscriber identifier that was sent to it (them) during the said subscriber identification step.

3. Process according to claim 2, characterized in that the said subscriber authentication step itself comprises the following steps:
the said management center and/or the said payment server and/or the said control center supplies a random number to the said mobile radiotelephone;
the said mobile radiotelephone generates a subscriber's electronic signature:
with an individual authentication algorithm and/or an individual authentication key contained in protected areas of the mobile radiotelephone, and
using the said random number;
the mobile radiotelephone transmits the said subscriber's electronic signature to the said management center and/or to the said payment server and/or to the said control center;
the said management center and/or the said payment server and/or the said control center checks the said subscriber's electronic signature.

4. Process according to claim 1, characterized in that the said process also includes the following step:
the said management center and/or the said payment server and/or the said control center authenticates the said buyer, and possibly a decision to purchase the goods and/or service purchased by the buyer.

5. Process according to claim 4, characterized in that the said buyer authentication step, and possibly the purchase decision, itself comprises the following steps:
the mobile radiotelephone generates a buyer's electronic signature;
the mobile radiotelephone sends the said buyer's electronic signature to the said management center and/or the said payment server and/or the said control center;
the said management center and/or the said payment server and/or the said control center checks the said buyer's electronic signature, the said buyer's electronic signature being kept available for use by the buyer and the supplier.

6. Process according to claim 4, characterized in that the said buyer authentication step, and possibly the purchase decision step, itself comprises the following steps:
the buyer may input a confidential payment code into the mobile radiotelephone, using a keypad associated with the mobile radiotelephone;
the mobile radiotelephone sends a secure transmission of the said confidential payment code to the said management center and/or the said payment server and/or the said control center;
the said management center and/or the said payment server and/or the said control center checks the said confidential payment code.

7. Process according to claim 5, characterized in that the said buyer authentication step, and possibly the purchase decision, also comprises the following preliminary step:
the buyer inputs a confidential payment code into the mobile radiotelephone using a keypad associated with the mobile radiotelephone.

8. Process according to claim 6 characterized in that the said step in which the said confidential payment code is input, is made using an input algorithm stored in the said mobile radiotelephone.

9. Process according to claim 6 characterized in that the said step in which the said confidential payment code is input, is made using at least one downloaded page in the HDML or an equivalent format provided for this purpose.

10. Process according to claim 5, characterized in that the said step in which the buyer's electronic signature is generated is carried out:
using a payment security algorithm and/or a payment security key contained in the protected areas of the mobile radiotelephone, and
starting from data about the transaction and/or data about the buyer.

11. Process according to claim 10, characterized in that at least some of the said data related to the transaction include a variability.

12. Process according to claim 10, the said mobile radiotelephone comprising a terminal cooperating with a subscriber identification module, characterized in that the said payment security algorithm and/or the said payment security key is (are) stored in protected areas of the said terminal.

13. Process according to claim 10, the said mobile radiotelephone comprising a terminal cooperating with a subscriber identification module, characterized in that the said payment security algorithm and/or the said payment security key is (are) stored in protected areas of the said subscriber identification module.

14. Process according to claim 1, characterized in that it also comprises the following step:
the mobile radiotelephone is unlocked if a comparison between a confidential identification code (PIN code) contained in protected areas of the mobile radiotelephone, and a secret key known to the buyer and input by the buyer into the mobile radiotelephone using a keypad, is positive.

15. Process according to claim 3, the said mobile radiotelephone comprising a terminal cooperating with a subscriber identification module, characterized in that at least one some of the said protected areas of the mobile radiotelephone are included in the said subscriber identification module.

16. Process according to claim 1, characterized in that it also comprises the following step:
data related to payment for the purchase of goods and/or the service are encrypted, exchanged between the mobile radiotelephone and the management center and/or the payment server and/or the control center, to ensure that the purchase is confidential.

17. Process according to claim 1, characterized in that it also comprises the following step:
a check of the integrity of data related to payment for the purchase of goods and/or the service exchanged between the mobile radiotelephone and the management center and/or the payment server and/or the control center, so that a defrauder is unable to modify the said data.

18. Process according to claim 1, characterized in that the said buyer is associated with an electronic wallet comprising:
a wallet identifier associated with a subscriber identifier specific to the said buyer, as a user of the said radio communications network;
means of payment;
information about the said buyer and/or the account(s) of the said buyer; use of the said means of payment, particularly when buying goods and/or a service not being authorized until the buyer has been successfully identified, and possibly authenticated.

19. Process according to claim 18, characterized in that the said electronic wallet also comprises:

a confidential payment code known to the said buyer.

20. Process according to claim 18, the said mobile radiotelephone comprising a terminal cooperating with a subscriber identification module, characterized in that the said electronic wallet is stored in one of the elements belonging to the group consisting of:

the said terminal;
the said subscriber identification module;
the said payment server;
the said management center;
the said control center.

21. System for remote payment of goods and/or a service purchased by a buyer from a supplier, in a secure manner using a mobile radiotelephone used by the said buyer, the said mobile radiotelephone providing access to a radio communications network managed by a management center, a payment server being connected to the said radio communications network, characterized in that the said system comprises means of implementing the process according to claim 1.

22. Mobile radiotelephone used by a buyer for remote payment of goods and/or a service purchased by a buyer from a supplier, in a secure manner using a mobile radiotelephone used by the said buyer, the said mobile radiotelephone providing access to a radio communications network managed by a management center, a payment server being connected to the said radio communications at work, characterized in that the said radiotelephone compromises means of implementing the process according to claim 1.

* * * * *